F. AND T. WIEHL.
STRAINER.
APPLICATION FILED DEC. 9, 1918.

1,303,438.

Patented May 13, 1919.

Inventors:
Ferdinand Wiehl and
Thomas Wiehl,
By Frederick V. Winters,
Attorney.

UNITED STATES PATENT OFFICE.

FERDINAND WIEHL AND THOMAS WIEHL, OF NEW YORK, N. Y.

STRAINER.

1,303,438.  Specification of Letters Patent.  Patented May 13, 1919.

Application filed December 9, 1918. Serial No. 265,866.

*To all whom it may concern:*

Be it known that we, FERDINAND WIEHL and THOMAS WIEHL, citizens of Austria, residing at New York, in the county and State of New York, have invented certain new and useful Improvements in Strainers, of which the following is a full, clear, and exact specification.

This invention relates to strainers especially designed for use in connection with internal combustion engines for removing foreign matter from the oil or fuel in its passage from the storage tank to the carbureter.

It is the aim of the invention to provide a strainer of this kind which may be easily introduced into the pipe line from the tank to the carbureter, which is simple in construction, has maximum capacity for its size so that there will be no stoppage in the flow of the oil, and which may be readily cleaned when necessary. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1:
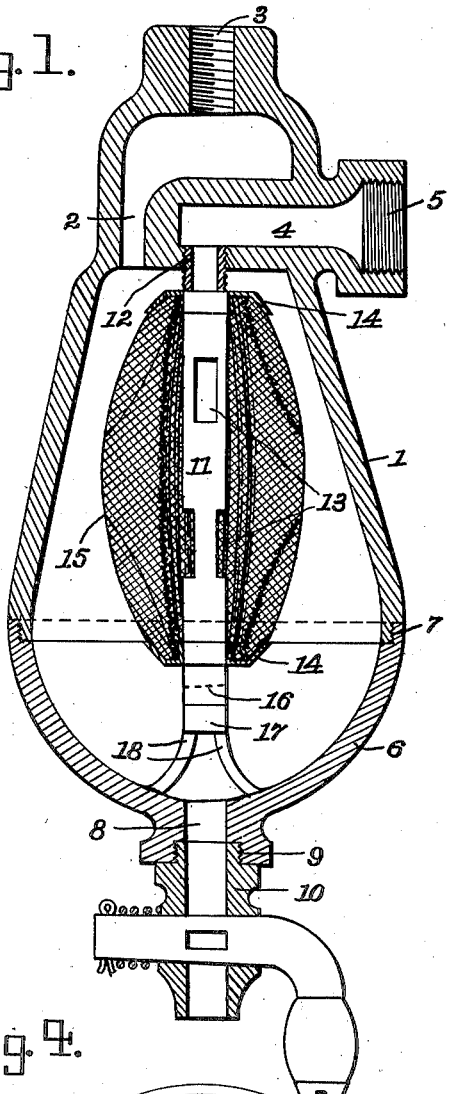
Figure 1 is a central vertical section of a strainer device constructed substantially in accordance with this invention.
Figure 2:
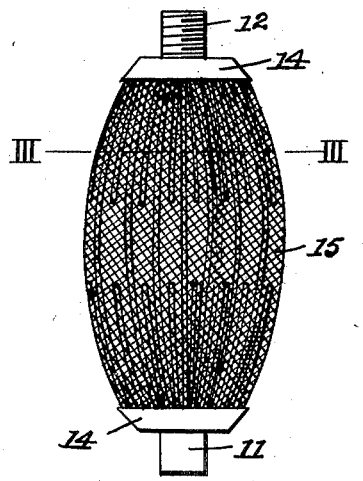
Fig. 2 is a detailed elevation of the strainer body.
Figure 4:
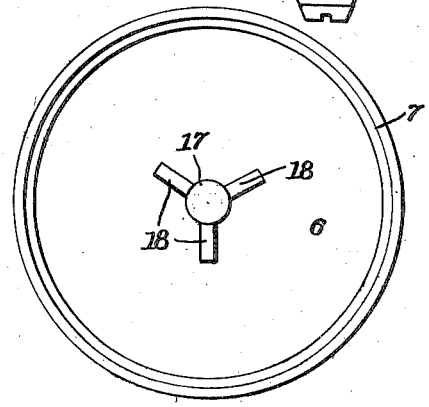
Fig. 4 is a plan view of the removable bottom section of the casing.

A casing 1 of suitable shape is provided with an intake port 2 adapted to be connected at 3 to a pipe (not shown) leading from a supply tank, and an outlet port 4 adapted to be connected at 5 to a pipe (also not shown) leading to a carbureter of an internal combustion engine. The lower portion 6 of the casing is made detachable by means of the screw threaded rabbeted joint 7. Said lower portion 6 of the casing has a drain port 8 at its base communicating with a suitable valve or cock 10.

A pipe or tube 11 has threaded connection at 12 with the outlet port 4 and depends therefrom centrally of the casing. Around said pipe a hollow strainer body 15 is secured between end collars 14 which make a liquid tight joint with both the pipe and strainer body. Perforations 13 in the pipe place the interior of the strainer body in communication with the outlet port, while the interior of the casing outside of said strainer body is in communication with the intake port, as clearly shown in Fig. 1. The lower end of the pipe 11 is plugged up, as indicated in dotted lines at 16 in Fig. 1, so as to prevent direct communication between the outside of the strainer body and the inside thereof through said pipe.

To support the strainer body and pipe 11 in position in the casing and remove undue strain from the threaded connection 12, the bottom section 6 of the casing has a stand 17 supported on spider legs 18 over the drain opening 8, so that when said bottom section 6 is screwed into place on the lower end of the casing proper at 7, said stand 17 will be brought up under the lower plugged end of the pipe 11 and serve the desired purpose. When the bottom section 6 is removed, the strainer body may be inserted or removed at the joint 12, it being easy to assemble the parts and replace a strainer when necessary. To clean the casing or remove the foreign matter which collects in the bottom of said casing, it is not even necessary to remove the bottom section 6, for such material may be drawn off via the drain opening 8 when the cock 10 is opened. In use, the oil or fuel from the supply tank normally fills the casing around the strainer body, and is drawn through the reticulate surface of said body as required to be fed to the carbureter.

Figure 3:
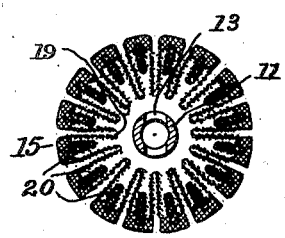
Fig. 3 is a section on the line III—III of Fig. 2.

The strainer body is generally cylindrical in form on the outside but is somewhat larger at the center than at the ends. The strainer material of which said body is made is formed into entrant folds, plaits or rebent portions 19 and 20 in order to provide the maximum straining surface for the outer diameter of the body. The folds, plaits or entrant rebent portions are preferably arranged longitudinally of the body and the rebent portions 19 preferably extend the full length of said body and are of greater depth than the rebent portions 20 which are not so deep and extend from the ends only part way toward the center. Said rebent portions 19 and 20 are preferably arranged radially of the body and alternate with each other as shown in Fig. 3. By this construction many times (approximately eighteen times) the straining surface or area is obtained than would be possible with a smooth continuous outer surface of the same size as that illustrated.

Having thus described our invention, what we claim as new and desire to secure by Letters Patent of the United States is:—

1. A strainer body comprising strainer material formed with longitudinal entrant rebent portions of different lengths.

2. A strainer body of ellipsoidal form having entrant rebent portions extending its full length and other entrant rebent portions extending only part way from each end toward the center.

3. A reticulate hollow strainer body of greater diameter at the center than at the ends and having longitudinal entrant rebent portions extending from end to end, and other shorter entrant rebent portions alternating with said longer rebent portions.

4. A reticulate hollow strainer body having rebent portions of different depths arranged radially around it, the rebent portions of greater depth alternating with those of less depth.

5. A reticulate hollow strainer body of greater diameter in the center than at the ends and having longitudinal entrant rebent portions extending from end to end, and shorter entrant rebent portions of less length and less depth alternating with said rebent portions extending from end to end.

In testimony whereof we have signed our names to this specification.

FERDINAND WIEHL.
THOMAS WIEHL.